United States Patent
Yang et al.

(10) Patent No.: US 9,841,986 B2
(45) Date of Patent: Dec. 12, 2017

(54) POLICY BASED APPLICATION MONITORING IN VIRTUALIZED ENVIRONMENT

(71) Applicant: VMware, Inc., Palo Alto, CA (US)

(72) Inventors: Yang Yang, Shanghai (CN); Jin Feng, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/923,453

(22) Filed: Oct. 27, 2015

(65) Prior Publication Data
US 2017/0116014 A1  Apr. 27, 2017

(51) Int. Cl.
G06F 9/455 (2006.01)
G06F 11/30 (2006.01)
G06F 11/34 (2006.01)

(52) U.S. Cl.
CPC ........ G06F 9/45558 (2013.01); G06F 11/301 (2013.01); G06F 11/3055 (2013.01); G06F 11/3495 (2013.01); G06F 2009/45575 (2013.01); G06F 2009/45591 (2013.01)

(58) Field of Classification Search
None
See application file for complete search history.

(56) References Cited

U.S. PATENT DOCUMENTS

| | | | |
|---|---|---|---|
| 2011/0154325 A1* | 6/2011 | Terasaki | G06F 9/455 718/1 |
| 2012/0185913 A1* | 7/2012 | Martinez | G06F 9/455 726/1 |
| 2012/0284628 A1* | 11/2012 | Wong | H04L 67/306 715/736 |
| 2013/0080360 A1* | 3/2013 | Sterritt | G05B 13/02 706/14 |
| 2013/0263209 A1* | 10/2013 | Panuganty | H04L 43/04 726/1 |
| 2014/0096134 A1* | 4/2014 | Barak | G06F 9/45558 718/1 |
| 2015/0212893 A1* | 7/2015 | Pawar | G06F 11/1448 707/649 |

(Continued)

OTHER PUBLICATIONS

"vRealize Hyperic Application & Performance Monitoring Features", retrieved Oct. 26, 2015 at <URL: http://www.vmware.com/products/vrealize-hyperic/features.html>.

Primary Examiner — Tuan Dao

(57) ABSTRACT

A method is provided for an agent in a virtual machine (VM) and an application policy manager to implement application monitoring and remediation. The application policy manager provides a user interface for defining policies for applications running on VMs where each policy includes monitoring conditions and remediation for the monitoring conditions. The application policy manager receives a policy for an application on the VM and sends it to the agent. The agent monitors the application based on the policy. When the agent detects a monitoring condition, the agent sends an alert identifying the application and the monitoring condition directly or indirectly to an events and alarms manager that records the alert, sends a log generated by the application to an email address or to an log analyzer that analyzes the log to determine a cause of the monitoring condition, and performs a remediation for the monitoring condition.

16 Claims, 2 Drawing Sheets

(56) References Cited

U.S. PATENT DOCUMENTS

2015/0229546 A1*  8/2015  Somaiya ............... H04L 43/045
                                                715/736
2017/0235594 A1*  8/2017  Vankadaru .......... G06F 9/45558

* cited by examiner

POLICY BASED APPLICATION MONITORING IN VIRTUALIZED ENVIRONMENT

BACKGROUND

Virtualization allows the abstraction of hardware resources and the pooling of these resources to support multiple virtual machines. For example, through virtualization, virtual machines with different operating systems may be run on the same physical machine. Each virtual machine is generally provisioned with virtual resources that provide similar functions as the physical hardware of a physical machine, such as central processing unit (CPU), memory and network resources to run an operating system and different applications.

DETAILED DESCRIPTION

Figure 1:
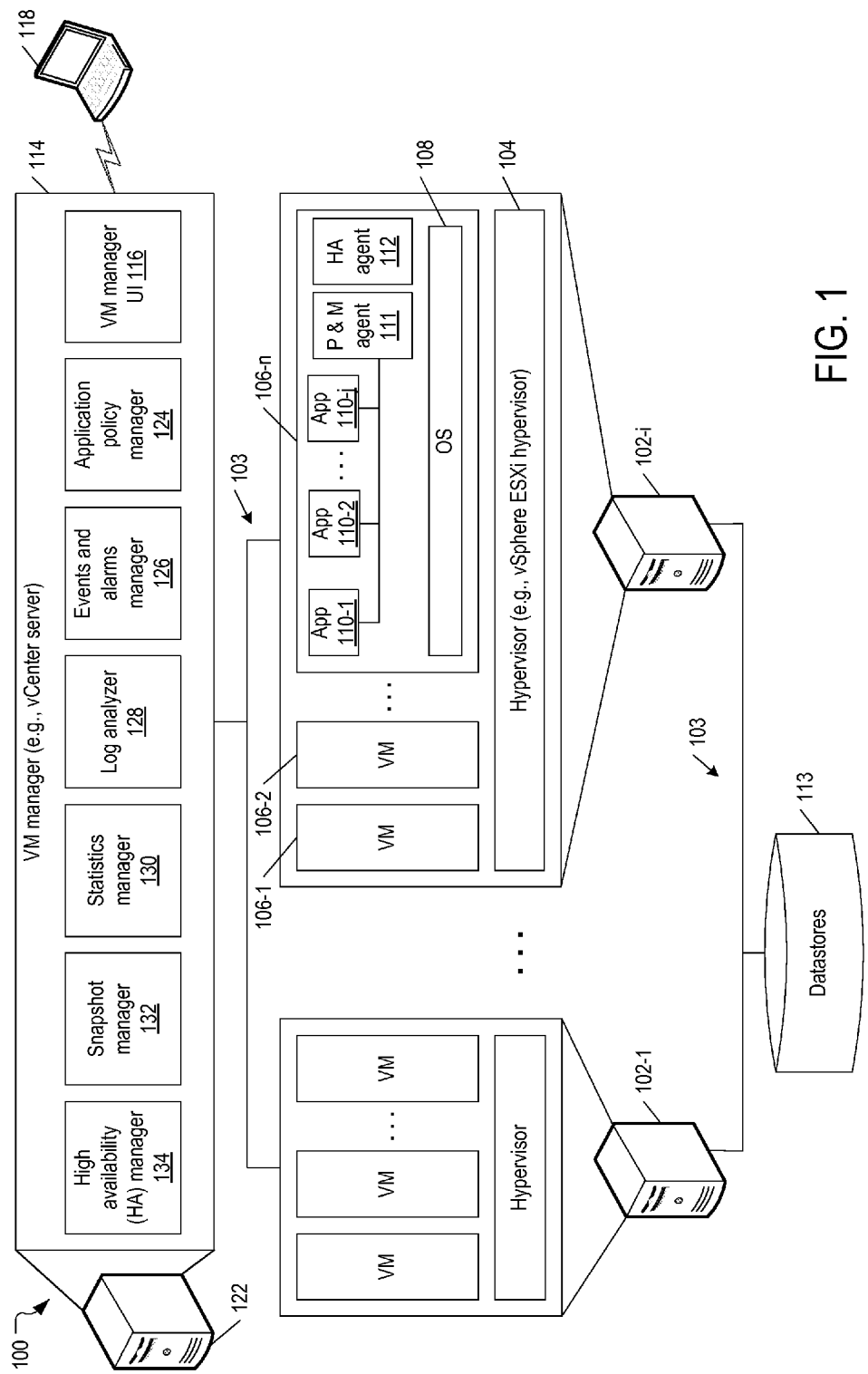
FIG. 1 is a block diagram illustrating a simplified view of a virtual machine (VM) system in examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

While policy-based virtual machine (VM) monitoring in a VM system is mature, policy-based application monitoring in a VM system has not been adequately developed. In particular policy-based application monitoring currently does not provide a sufficient reaction mechanism to detected failures.

In examples of the present disclosure, an application policy manager provides a central user interface (UI) for users to define policies for applications on different VMs in a VM system. The application policy manager sends each policy to a policy and monitoring agent on a corresponding VM. When a monitoring condition for an application on a VM is detected, the policy and monitoring agent sends an alert identifying the application and the monitoring condition directly or indirectly to an events and alarms manager to record the alert, sends a log generated by the application to an email address or directly or indirectly to a log analyzer to determine a cause of the monitoring condition, and performs a remediation for the monitoring condition. The method may include additional reactions or interactions with other managers, such as the application policy manager receiving a request for the health of a VM at a specific time from a snapshot manager, determining the health of the VM based on the health of its applications, and providing the health of the VM to the snapshot manager so the snapshot manager can determine if the VM is to be rolled back using the snapshot captured at that time.

FIG. 1 is a block diagram illustrating a simplified view of a VM system 100 in examples of the present disclosure. VM system 100 may be a VMware® datacenter. VM system 100 includes host computers 102-1 . . . 102-*i* (collectively as "hosts 102" or as a generic individual "host 102"). Hosts 102 are coupled to each other through a network 103. Host 102-*i* includes physical memory, processor, and network interface cards (NICs). Host 102-*i* runs a hypervisor 104 that creates and runs VMs 106-1, 106-2 . . . 106-*n* (collectively as "VMs 106" or as a generic individual "VM 106"). Hypervisor 104 may be a VMware vSphere® hypervisor.

VM 106-*n* includes virtualized memory and processor that executes a guest operating system (OS) 108 and one or more applications 110-1 . . . 110-*j* (collectively as "applications 110" or as a generic individual "application 110"), and virtualized NICs that communicate with other VMs. A policy and monitoring agent 111 and a high availability (HA) agent 112 may be included in a suite of utilities (e.g., VMware Tools) installed on guest OS 108 to enhance the performance of the guest OS and improve management of the VM. Policy and monitoring agent 111 monitors and remedies applications 110 per user-defined policies. HA agent 112 periodically generates a heartbeat signal to indicate normal operation of the VM. Host 102-*i* is coupled to datastores 113 that store virtual machine files. Datastores 113 may be local storage or remote storage accessed through network 103.

Other VMs 106 may be similarly configured as VM 106-*n*, and other hosts 102 may be similarly configured as host 102-*i*. A number of hosts 102 and their associated VMs 106 may form a cluster that work together as a unit to provide high-availability and load balancing.

VM system 100 includes a VM manager 114 providing a UI 116 for centrally provisioning and managing virtual and physical objects in VM system 100, such as VMs 106, clusters, and hosts. UI 116 may include a web client that allows an administrator to manage the objects from a browser. For example, an administrator uses a computer 118 to remotely access UI 116 to provision and manage the objects. Alternatively the administrator locally accesses UI 116 of VM manager 114 or a command-line interface (CLI) to hypervisor 104 to provision and configure the objects. VM manager 114 may run a host 122 coupled by network 103 to hosts 102 or on one of hosts 102.

VM manager 114 includes an application policy subsystem or manager 124, an events and alarms subsystem or manager 126, a log analyzer 128 (e.g., VMware vRealize Log Insight), a statistics subsystem or manager 130, a snapshot subsystem or manger 132, and a HA subsystem or manager 134. Although application policy manager 124, events and alarms manager 126, log analyzer 128, statistics manager 130, snapshot manger 132, and HA manager 134 are shown to be located on the same host 122, they may be located on different hosts, the same VM, or different VMs on the same or different hosts.

Application policy manager 124 centrally receives user-defined policies for monitoring and remedying applications 110 on VMs 106 and sends the policies to the policy and monitoring agents 111 on the VMs. Application policy manager 124 may also communicate with other subsystems and managers like events and alarms manager 126 and log analyzer 128 for notification and remediation operations. Events and alarms manager 126 tracks and stores events and alarms that take place in system 100. Log analyzer 128 collects and analyzes log data including application logs, network traces, configuration files, messages, performance data and system state dumps. Statistics manager 130 collects and stores statistical data of system 100 including CPU, memory, disk, network, host power, system, and VM operations metrics. Snapshot manager 132 periodically captures snapshots of VMs 106 so a VM may be rolled back to a point in time using a snapshot captured at that time. HA manager 134 restarts a VM 106 if a heartbeat signal is not received from the HA agent 112 on the VM within a set time. Application policy manager 124, events and alarms manager 126, log analyzer 128, statistics manager 130, and snapshot manager 132 may have UIs integrated with UI 116 of VM manager 114.

Figure 2:
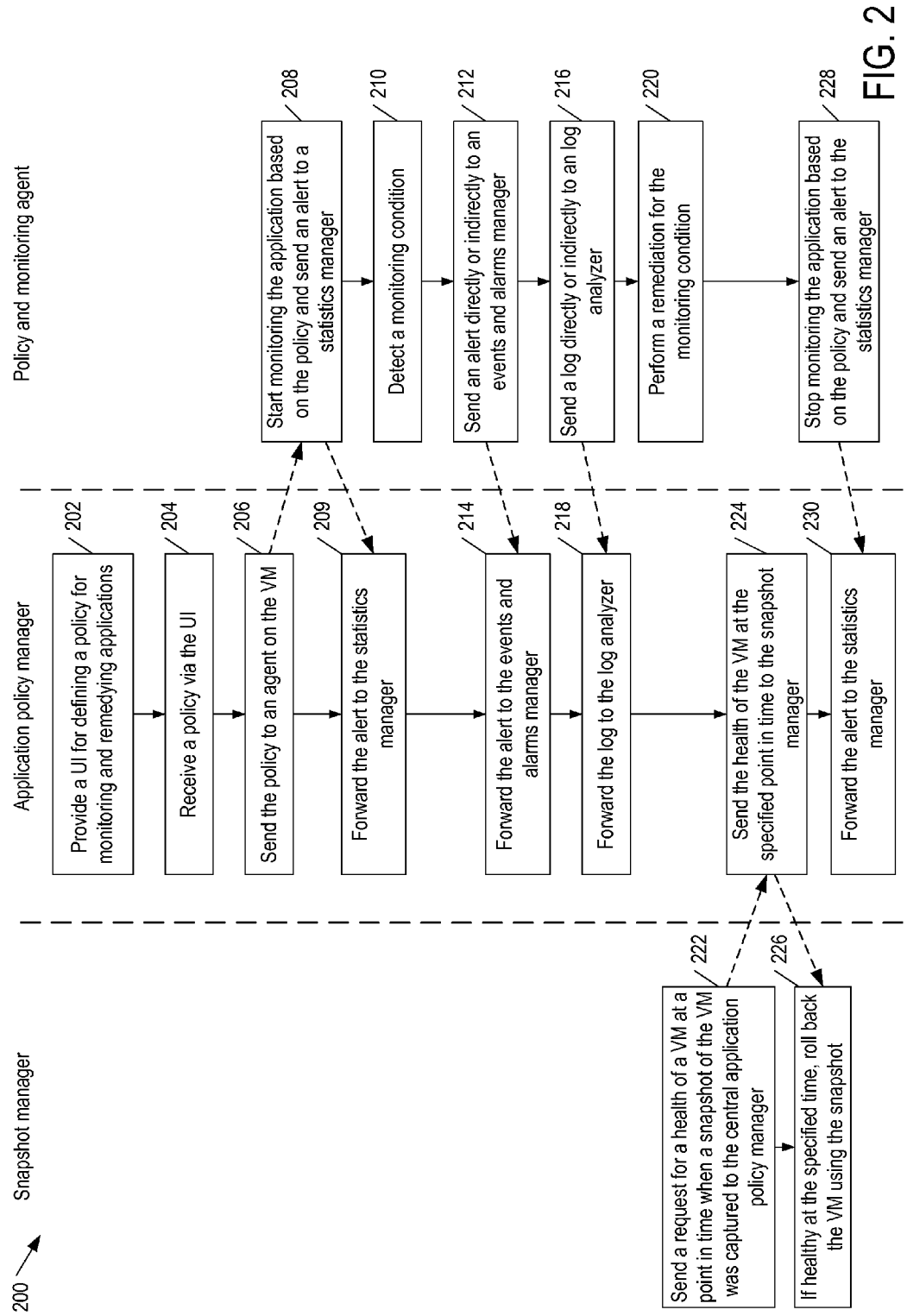
FIG. 2 is a swim lane flowchart of a method for an application policy manager on a first host and an agent in a VM on a second host to implement policy-based application monitoring and remediation in examples of the present disclosure.

FIG. 2 is a swim lane flowchart of a method 200 for application policy manager 124 (FIG. 1) on a first host 122 (FIG. 1) and a policy and monitoring agent 111 (FIG. 1) in a VM 106-$n$ (FIG. 1) on the first host or a second host 102-$i$ (FIG. 1) to implement policy-based application monitoring and remediation in examples of the present disclosure. Method 200 may be executed by processors of hosts executing computer readable codes of application policy manager 124, policy and monitoring agent 111, events and alarm manager 126 (FIG. 1), log analyzer 128 (FIG. 1), statistics manager 130 (FIG. 1) snapshot manager 132 (FIG. 1), and HA manager 134 (FIG. 1). Method 200 may begin with block 202.

In block 202, application policy manager 124 provides a UI for defining monitoring and remediation policies for applications running on VMs 106 (FIG. 1). The UI of application policy manager 124 may be integrated with UI 116 of VM manager 114. Block 202 may be followed by block 204.

In block 204, assume application policy manager 124 receives a user-defined policy for application 110-$j$ on VM 106-$n$ via UI 116 for the purpose of demonstrating method 200. An administrator on computer 118 may remotely access UI 116 to select an application 110-$j$ on VM 106-$n$ and define the policy for that application. The policy includes one or more monitoring conditions and one or more remediation. A monitoring condition may be a start condition for monitoring the application, a stop condition for monitoring the application, a number of missing heartbeats, a number of restart failures, or a threshold for a performance metric or a combination of performance metrics related to the application. A remediation may be restarting an application, restarting the application and a related application, restarting a VM, restarting a host, deleting temporary data to free storage space, reconfigure the application so it wakes up after a longer sleep period to reduce resource usage, or purging old data. A related application should be restarted when an application it depends from is being restarted, such as an application connected to a database is to be restarted when the database is restarted so a new connection can be established between the two applications.

One example of a policy for an application A on a VM includes (a) restarting application A when three (3) consecutive heartbeats are missed, and (b) restarting the VM when application A fails to restart for three (3) times. One example of a policy for an application B on a VM related to an application A on the same or different VM includes restarting application B when application A restarts. One example of a policy for an application C on a VM includes emailing a log of application C to an email address.

Block 204 may be followed by block 206.

In block 206, application policy manager 124 sends the policy to the policy and monitoring agent 111 on the VM 106-$n$ where the selected application 110-$j$ is located. Block 206 may be followed by block 208.

In block 208, policy and monitoring agent 111 starts monitoring application 110-$j$ based on the policy. For example, policy and monitoring agent 111 starts monitoring application 110-$j$ based on a start condition and sends an alert directly to statistics manager 130 or indirectly to the statistics manager through application policy manager 124. In response, statistics manager 130 starts collecting statistics related to application 110-$j$, VM 106-$n$, and host 102-$i$. During the monitoring period, policy and monitoring agent 111 periodically monitors for a number of missing health indicators, a number of restart failures, a threshold for a performance metric or a combination of performance metrics related to the application, or another monitoring condition The health indicator may be the presence of a socket or a process ID (PID) file of an application. Policy and monitoring agent 111 may collect performance metrics of the application by querying guest OS 108 with the application's PID stored in its PID file. Typical performance metrics include memory and CPU usage. Policy and monitoring agent 111 may also use disk usage (du) commands to determine the application's disk usage. For example, a monitoring condition for an application may be a threshold for memory or disk usage and a remediation for the monitoring condition may be to restart the application.

Block 208 may be followed by block 209.

In block 209, application policy manager 124 forwards the alert to statistics manager 130, which starts collecting statistics related to application 110-$j$, VM 106-$n$, and host 102-$i$.

In block 210, assume policy and monitoring agent 111 detects a monitoring condition for application 110-$j$ for the purpose of demonstrating method 200. Block 210 may be followed by block 212.

In block 212, policy and monitoring agent 111 sends an alert directly to events and alarms manager 126 or indirectly to the events and alarms manager through application policy manager 124. The alert has detailed information about application 110-$j$, the monitoring condition that triggered the alert, the remediation to be performed, and other related information. Events and alarms manager 124 saves the alert in a log and optionally sends an alert (e.g., email) to an administrator or perform another action. Using the log, events and alarms manager 124 is able to present a report through UI 116 (FIG. 1) on applications that are not behaving normally and remediation for the applications (e.g., an application failed to restart three (3) times so its VM is to be restarted). Based on the report, the administrator may determine if further manual intervention is needed. Block 212 may be followed by optional block 214.

In optional block 214, application policy manager 124 forwards the alert received from policy and monitoring agent 111 to events and alarms manager 126, which saves the alert and optionally sends a message to an administrator or perform another action. Optional block 214 may be followed by block 216.

In block 216, policy and monitoring agent 111 sends application log kept by application 110-$j$ directly to log analyzer 128 or indirectly to the log analyzer through application policy manager 124. Each application 110 keeps its application log in a known folder and the application log includes data used to debug any failure. Log analyzer 128 analyzes the log to determine a possible cause of the monitoring condition. As part of the analysis, log analyzer 128 may access statistics kept by statistics manager 130. Block 216 may be followed by optional block 218.

In optional block 218, application policy manager 124 forwards the log received from policy and monitoring agent 111 to log analyzer 128, which analyzes the log to determine a possible cause of a monitoring condition. Optional block 218 may be followed by block 220.

In block 220, policy and monitoring agent 111 performs a remediation defined for the detected monitoring condition, such as restarting application 110-*j* or VM 106-*n*. When the remediation is to restart VM 106-*n*, policy and monitoring agent 111 may stop HA agent 112 from sending the periodic heartbeat signal to HA manager 134 so that the HA manager would restart the VM. For example, policy and monitoring agent 111 uses a library (e.g., libappmonitor) to stop HA agent 112 from sending the heartbeat signal. Block 220 may be followed by block 222.

In block 222, assume snapshot manager 132 wishes to use a snapshot captured at a point in time to roll back VM 106-*n* and sends a request to learn the health of VM 106-*n* at the specified point in time to application policy manager 124 for the purpose of demonstrating method 200. Specifically snapshot manager 132 wishes to learn the health of applications 110 on VM 106-*n* the specified point in time. Alternatively snapshot manager 132 sends the request to policy and monitoring agent 111 on VM 106-*n*. Block 222 may be followed by a block 224.

In block 224, application policy manager 124 determines from its records the health of VM 106-*n* at the specified point in time based on the health of applications 110 on VM 106-*n* and sends the result back to snapshot manager 132. For example, application policy manager 124 determines VM 106-*n* is healthy at a point in time if there are no alerts from policy and monitoring agent 111 on that VM for a period of time prior to that point in time so remediation is assumed to have addressed the alerts. In another example, application policy manager 124 queries policy and monitoring agent 111 on VM 106-*n* for the health of applications 110 on the VM. Alternatively policy and monitoring agent 111 performs these actions and sends the heath of VM 106-*n* at the specified time to snapshot manager 132. Block 224 may be followed by block 226.

In block 226, if VM 106-*n* is healthy at the specified point in time, snapshot manager 132 uses the snapshot captured at the specified point in time to roll back VM 106-*n*. Block 226 may be followed by block 228.

In block 228, policy and monitoring agent 111 stops monitoring application 110-*j* based on the policy. For example, policy and monitoring agent 111 starts monitoring application 110-*j* based on a stop condition and sends an alert directly to statistics manager 130 or indirectly to the statistics manager through application policy manager 124. In response statistics manager 130 stops collecting statistics related to application 110-*j*, VM 106-*n*, and host 102-*i*. Block 228 may be followed by block 230.

In block 230, application policy manager 124 forwards the alert to statistics manager 130, which may stop collecting statistics related to application 110-*j*, VM 106-*n*, and/or host 102-*i*. As an example, if there are issues associated with application 110-*j* only, then the statistics related to application 110-*j* are not collected, but the statistics related to VM 106-*n* and host 102-*i* are collected.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for an application policy manager and an agent to implement policy-based application monitoring and remediation in a virtual machine (VM) system, the agent being installed on a guest operating system (OS) of a VM on a host, the method comprising:

the application policy manager providing a user interface for defining policies on applications running on VMs, each policy comprising one or more monitoring conditions and one or more remediation for the one or more monitoring conditions;

the application policy manager receiving a policy for an application on the VM via the user interface;

the application policy manager sending the policy to the agent running on the VM;

the agent monitoring the application based on the policy received from the application policy manager, comprising:

in response to the agent detecting a start condition, the agent starting monitoring the application and sending a first alert directly to a statistics manager or indirectly to the statistics manager via the application policy manager, wherein the statistics manager starts collecting performance metrics related to the application in response to the first alert; and in response to the agent detecting a stop condition, the agent stopping monitoring the application and sending a second alert directly to the statistics manager or indirectly to the statistics manager via the application policy manager, wherein the statistics manager stops collecting the performance metrics related to the application in response to the second alert;

when the agent detects a monitoring condition for the application specified in the policy, the agent:

sending an alert identifying the application and the monitoring condition directly to an events and alarms manager or indirectly to the events and alarms manager via the application policy manager, wherein the events and alarms manager records the alert;

sending a log generated by the application to an email address, directly to a log analyzer or indirectly to the log analyzer via the application policy manager, wherein the log analyzer analyzes the log to determine a cause of the monitoring condition; and performing a remediation specified in the policy for the monitoring condition.

2. The method of claim 1, further comprising, when the application policy manager receives the alert or the log, the application policy manager sending the alert or the log to the events and alarms manager.

3. The method of claim 1, further comprising:

the agent or the application policy manager receiving a request to learn a health of the VM at a point in time from a snapshot manager;

the agent or the application policy manager determining the health of the VM at the point in time based on health of one or more applications on the VM; and the agent or the application policy manager sending the health of the VM at the point in time to the snapshot manager, wherein the snapshot manager uses a snapshot captured at the point in time to roll back the VM when the VM was health at the point in time.

4. The method of claim 1, wherein the remediation comprises restarting the VM.

5. The method of claim 4, wherein the agent performs the remediation by causing another agent in the VM to stop sending a heartbeat signal to a high availability manager and, in response to not periodically receiving the heartbeat signal, the high availability manager restarts the VM.

6. The method of claim 1, wherein the one or more monitoring conditions comprise a start condition for monitoring the application, a stop condition for monitoring the application, a number of missing health indicators, a number of restart failures, or a threshold for a performance metric related to the application.

7. The method of claim 1, wherein the one or more remediation comprise restarting the application, restarting the application and another application, restarting the VM, restarting the host, deleting temporary data, reconfiguring the application with a longer sleep period, or purging old data.

8. The method of claim 1, wherein the application policy manager, the events and alarms manager, and the log analyzer are implemented on another host, another VM, or different VMs.

9. A virtual machine (VM) system comprising one or more host computers each having a memory and a processor configured to implement:
   an application policy manager being configured to:
      provide a user interface for defining policies on applications running on VMs, each policy comprising one or more monitoring conditions and one or more remediation for the one or more monitoring conditions;
      receive a policy for an application running on a VM implemented on a host via the user interface;
      send the policy to an agent in the VM, wherein the agent is installed on a guest operating system (OS) of the VM;
   the agent being configured to:
      monitor the application based on the policy received from the application policy manager;
      when a monitoring condition for the application is detected:
         send an alert identifying the application and the monitoring condition directly to the events and alarms manager or indirectly to the events and alarms manager via the application policy manager;
         send a log generated by the application to an email address, directly to a log analyzer or indirectly to the log analyzer via the application policy manager; and
         performing a remediation specified in the policy for the monitoring condition;
   a statistics manager being configured to start and stop collecting performance metrics related to the application, wherein
      in response to the agent detecting a start condition, the agent starts monitoring the application and sends a first alert directly to the statistics manager or indirectly to the statistics manager via the application policy manager to cause the statistics manager to start collecting the performance metrics related to the application; and
      in response to the agent detecting a stop condition, the agent stops monitoring the application and sends a second alert directly to the statistics manager or indirectly to the statistics manager via the application policy manager to cause the statistics manager to stop collecting the performance metrics related to the application;
   the events and alarms manager, the events and alarms manager being configured to records alerts and events including the alert; and
   the log analyzer, the log analyzer being configured to analyze the log to determine a cause of the monitoring condition.

10. The VM system of claim 9, wherein when the application policy manager receives the alert or the log, the application policy manager is further configured to send the alert or the log to the events and alarms manager.

11. The VM system of claim 9, wherein the one or more host computers implement a snapshot manager configured to send a request to the agent or the application policy manager to learn a health of the VM at a point in time and use a snapshot captured at the point in time to roll back the VM when the VM was healthy at the point in time, wherein the agent or the application policy manager is further configured to determine the health of the VM at the point in time from health of one or more applications on the VM and send the health of the VM at the point in time to the snapshot manager.

12. The VM system of claim 9, wherein the remediation comprises restarting the VM.

13. The VM system of claim 12, wherein the one or more host computers further implement:
   another agent on the VM configured to periodically send a heartbeat signal to a high availability manager, wherein the agent performs the remediation by causing the other agent to stop sending the heartbeat signal to the high availability manager; and
   the high availability manager configured to restart the VM when the heartbeat signal is not periodically received.

14. The VM system of claim 9, wherein the one or more monitoring conditions comprise a start condition for monitoring the application, a stop condition for monitoring the application, a number of missing health indicators, a number of restart failures, or a threshold for a performance metric related to the application.

15. The VM system of claim 9, wherein the one or more remediation comprise restarting the application, restarting the application and another application, restarting the VM, or restarting the host, deleting temporary data, reconfiguring the application with a longer sleep period, or purging old data.

16. The VM system of claim 9, wherein the application policy manager, the events and alarms manager, and the log analyzer are implemented on another host, another VM, or different VMs.

* * * * *